(12) United States Patent
Myers

(10) Patent No.: US 6,226,920 B1
(45) Date of Patent: May 8, 2001

(54) PLANT WATERING DEVICE

(75) Inventor: Kenneth J. Myers, 2 Main St. Apartment 2S, Dobbs Ferry, NY (US) 10522

(73) Assignees: Kenneth J. Myers; Edward J. Greenberg, both of Irvington, NY (US)

( * ) Notice: Subject to any disclaimer, the term of this patent is extended or adjusted under 35 U.S.C. 154(b) by 0 days.

(21) Appl. No.: 09/522,948

(22) Filed: Mar. 10, 2000

(51) Int. Cl.$^7$ ................................................. A01G 29/00
(52) U.S. Cl. ............................................................ 47/48.5
(58) Field of Search ............................... 47/48.5, 47, 67, 47/79, 80, 82, 83; 137/862; 405/45

(56) References Cited

U.S. PATENT DOCUMENTS

| | | | |
|---|---|---|---|
| D. 278,075 | * 3/1985 | Dryden | 47/48.5 |
| 1,063,395 | 6/1913 | Scribner | 47/67 |
| 1,231,975 | 7/1917 | Weitzel | 47/79 |
| 1,453,401 | 5/1923 | Mattson | 137/862 |
| 3,311,270 | 3/1967 | Juergens | 222/181.3 |
| 4,060,934 | 12/1977 | Skaggs | 47/79 |
| 4,115,951 | * 9/1978 | Becker et al. | 47/81 |
| 4,235,561 | * 11/1980 | Peterson | 405/45 |
| 4,745,706 | 5/1988 | Muza et al. | 47/47 |
| 4,825,591 | 5/1989 | Han | 47/67 |
| 4,961,285 | * 10/1990 | Jenkins et al. | 47/79 |
| 4,993,176 | 2/1991 | Spinosa | 47/40.5 |
| 5,117,582 | * 6/1992 | Cissel et al. | 47/25 |
| 5,806,240 | * 9/1998 | Racine | 47/79 |
| 5,848,494 | 12/1998 | Spelt | 47/67 |
| 5,867,929 | 2/1999 | Jung et al. | 47/40.5 |
| 6,023,883 | * 2/2000 | Bacon | 47/48.5 |

FOREIGN PATENT DOCUMENTS

1104205 * 11/1955 (FR) ................................. 47/48.5 G

* cited by examiner

Primary Examiner—Charles T. Jordan
Assistant Examiner—Fisnai T. Palo
(74) Attorney, Agent, or Firm—Bacon & Thomas, PLLC

(57) ABSTRACT

A watering device includes a receptacle having a hollow interior arranged to hold water and to permit passage of water to an exterior of the main body at a rate sufficient to cause the water to form droplets on the exterior of the receptacle and to drip onto the soil surrounding a plant to be watered. Rather than using mounting hardware to suspend the watering device over the surface, the watering device is arranged to be supported by supporting elements that sit directly on the surface. The receptacle is in the shape of a character, with the supporting elements and a cap that permits the receptacle to be filled with water both having a shape consistent with the nature of the character represented by the shape of the receptacle main body.

10 Claims, 2 Drawing Sheets

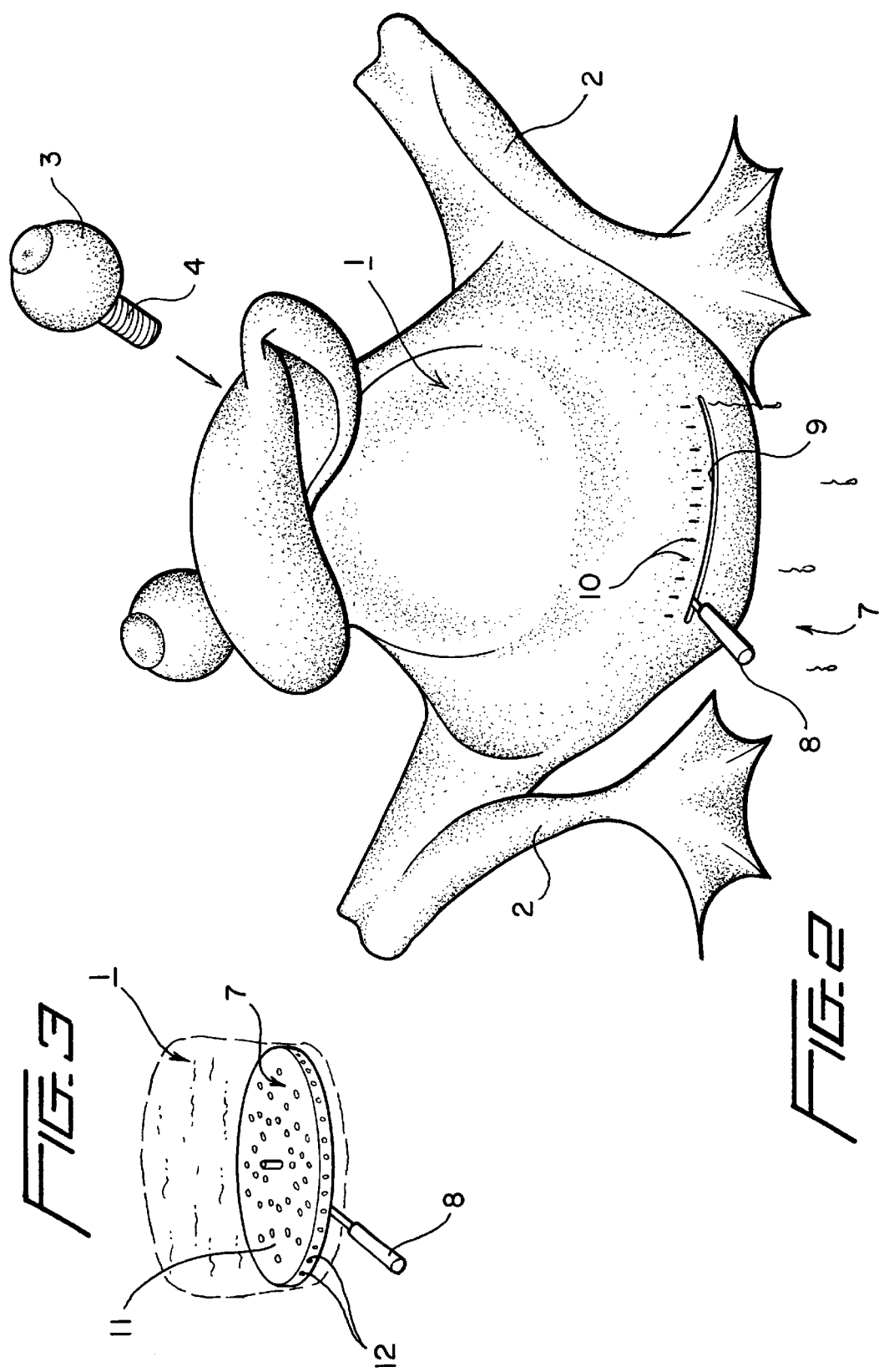

PLANT WATERING DEVICE

BACKGROUND OF THE INVENTION

1. Field of the Invention

This invention relates to a plant watering device, and in particular to a plant watering device which supplies water at a predetermined rate to plants so that the plants may be left unattended when the owner is away. The plant watering device of the invention requires no brackets or mounting hardware, but rather may simply be positioned directly on the soil adjacent the plant to be watered. Preferably, the watering device has an ornamental appearance.

2. Description of Related Art

A number of designs have been proposed for automatically supplying water to houseplants. These include the "Self Watering Flower Pot" of U.S. Pat. No. 1,063,395, the "Watering Attachment For Flower Pots" of U.S. Pat. No. 1,231,975, the "Plant Waterer" of U.S. Pat. No. 1,453,401, the "Water Tender" of U.S. Pat. No. 4,060,934, the "Plant Watering And Feeding Stake" of U.S. Pat. No. 4,745,706, the "Automatic Watering Device For Plants" of U.S. Pat. No. 4,825,591, and the "Self-Watering Apparatus For Plant" of U.S. Pat. No. 5,848,494.

These automatic plant watering devices generally fall into one of two categories. The first category of watering device is represented by the devices described in the above-mentioned U.S. Pat. Nos. 4,060,934, 4,825,591, and 5,848,494, which valves or other mechanisms designed to vary the flow of water to the plant based on the amount of moisture in the soil. While devices with variable flow are useful in environments where water consumption varies significantly due to environmental conditions, houseplants are typically kept in a controlled or constant environment, and therefore such variable flow control is not necessary.

The present invention belongs to the second category of watering devices, represented by the plant watering devices described in the above-mentioned U.S. Pat. Nos. 1,063,401, 1,231,975, and 1,453,401, all of which supply water to the plant at a preset rate rather than with variable flow or moisture feedback. However, each of the devices disclosed in these patents requires a relatively complex structure for positioning the devices above the soil to be watered, for example by mounting the devices on the rim of a flower pot. The need for mounting hardware not only makes the prior devices unduly high in cost and inconvenient for many potential users, limiting the settings in which the devices can be used, but the associated brackets, clamps, hoses, and the like tend to detract from the natural appearance of the plant to be watered.

A third category of self-watering devices which seeks to provide a more attractive appearance is represented by the Christmas tree watering devices disclosed in U.S. Pat. Nos. 3,311,270 ("Automatic Water Dispenser For Christmas Tree Stands"), 4,993,176 (Christmas Tree Stand Watering System"), and U.S. Pat. No. 5,867,929 ("E-Z Christmas Tree Waterer"). However, the designs of these devices is fundamentally different than those of the plant watering devices described above because Christmas trees are typically placed in a container of water rather than planted in soil, and thus the watering devices must be designed to dispense directly into the pool of water. Placement of a tube into the pool provides an inherent means of flow control, but on the other hand necessitates suspension of the watering device above the pool.

In contrast to all of the watering devices mentioned above, the present invention seeks to dispense water to the soil surrounding a living plant upon simply being placed beside the plant, without the need for attachment of mounting hardware, insertion of tubes, or the like. As a result, the invention provides a watering device that is especially simple in construction and attractive, and yet that is easier to use than any of the prior designs.

SUMMARY OF THE INVENTION

It is accordingly a first objective of the invention to provide a plant watering device that is especially simple in construction and use.

It is a second objective of the invention to provide a plant watering device that does not require mounting hardware.

It is a third objective of the invention to provide a plant watering device that provides a predetermined drip rate and that is therefore especially suitable for watering plants in a controlled environment, such as house plants.

It is a fourth objective of the invention to provide a plant watering device having an attractive design, and in particular a plant watering device having the exterior configuration of a character, such as an animal.

It is a fifth objective of the invention to provide a plant watering device having the exterior configuration of a character, and in which the shape of supports for the plant watering device and the shape of a filler cap are consistent with the character so as not to detract from the overall appearance of the character.

These objectives are achieved, in accordance with the principles of a preferred embodiment of the invention, by providing a plant watering device in the form of an enclosed receptacle designed to hold water, and further designed to be placed directly on the soil surrounding the plant to be watered, eliminating the need for mounting hardware. The walls of the receptacle are arranged to permit passage of water from the interior to the exterior of the receptacle so that the water drips onto the soil at a predetermined rate.

Preferably, the receptacle is in the shape of a character. The character may be a life-like animal, a cartoon character, or any other representation of an animate object, whether real or imaginary. The legs or other supporting appendages of the animate object may then be used to elevate the receptacle above the surface on which it is placed, while a protruding body part may form a removable cap through which water may be introduced to the interior of the receptacle. In an exemplary implementation of the preferred embodiment, the receptacle is in the shape of toad, and the protruding body part is the eye of a toad, which includes a threaded extension arranged to be screwed into a corresponding opening in the main body of the receptacle.

In use, the watering device of the preferred embodiment may simply be filled with water through the opening in the main body of the receptacle, followed by threading of a filler cap into the opening to close the opening, and placement of the watering device on the soil surrounding the plant to be watered. The watering device may be used not only to ensure a supply of water to the plant when the owner is away, to save the trouble of daily watering even when the owner is present, or to ensure a more even supply of water to the plant in order to prevent the over-watering that might occur if an amount of water corresponding to the capacity of the watering device were poured on the plant all at once. The attractive shape of the watering device will encourage its use even when manual watering would not otherwise be inconvenient.

In a variation of the preferred embodiment of the invention, an optional flow adjustment device may be included in the watering device, enabling the predetermined drip rate to be varied to meet the requirements of particular plants, environments, or other circumstances.

BRIEF DESCRIPTION OF THE DRAWINGS

FIG. 2 is a front elevation showing a variation of the watering device of FIG. 1.

FIG. 3 is a schematic diagram showing an example of a flow control device that could be included in the watering device of FIG. 2.

DETAILED DESCRIPTION OF THE PREFERRED EMBODIMENTS

Figure 1:
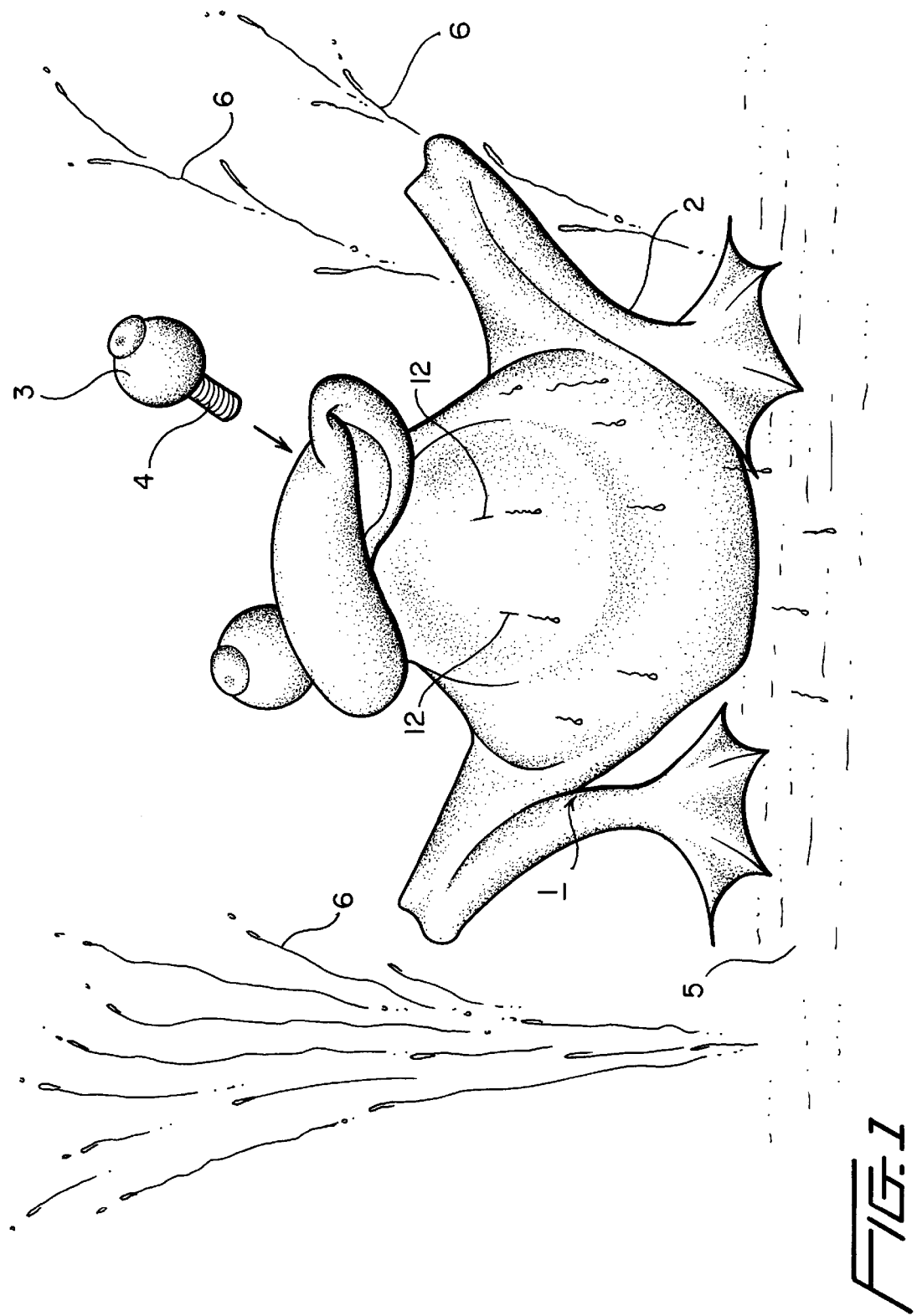
FIG. 1 is a front elevation of a watering device constructed in accordance with the principles of a preferred embodiment of the invention.

FIG. 1 illustrates a preferred embodiment of the plant watering device of the invention. The preferred plant watering device is made up of a main body 1 having the shape of a character, and in particular a toad, supporting elements 2 in the form of legs, and at least one removable filler cap 3 in the form of an eye and having an externally threaded portion 4 arranged to be threaded into an opening (not shown) in the "head" portion of the main body 1.

Main body 1 forms a hollow receptacle arranged to permit passage of water at a predetermined rate. In order to enable passage of water, the illustrated watering device includes a plurality of slits or openings 12 of sufficient size to permit water to pass through the slits and form droplets on the exterior of the receptacle, the droplets then running down the sides of the exterior and onto the soil 5 on which the main body is placed.

Considerations in selecting the size of the slits or openings 12 include the following: If the openings are too large, water will stream out of the receptacle and the receptacle will empty too rapidly, but if the openings are too small, depending on the ambient temperature and humidity, insufficient water will pass through the openings to form droplets before the water evaporates. Fortunately, most indoor environments have a relatively narrow range of ambient temperatures and the size of the slits or openings 12 can be selected accordingly.

In general, the material of the receptacle may include any substance capable of being formed in a desired shape, and having sufficient rigidity to hold that shape. Suitable materials include PVC foam materials, which have the advantage of an attractive appearance, as well as other similar plastics. A less porous material with appropriately sized openings is preferred because if the material of the receptacle is too porous, water will simply evaporate from its surface and will fail to form droplets on the exterior of the receptacle. Nevertheless, it is also within the scope of the invention to make the receptacle of a more porous sponge-like material which, when saturated, will allow sufficient water flow to cause droplet formation before the water evaporates. In addition, it is within the scope of the invention to form the receptacle of multiple layers including, by way of example, a rigid metal or plastic inner layer with openings, a porous middle layer, and/or a cloth, rubber, or plastic foam outer layer having appropriate slits or openings 12.

It will be appreciated by those skilled in the art that the openings may be added during manufacture, or may be an inherent feature of the material, as is the case with some foam materials. Furthermore, it is intended that the invention not be limited to a particular material or arrangement of materials, but rather that the invention encompass all material arrangements that permit passage of water at a rate sufficient to cause the water to drip down onto the soil on which the receptacle is situated.

Unlike the arrangements of the prior art, the watering device of the invention is designed to be used without any sort of mounting hardware, brackets, tubes, or the like. Instead, the watering device is simply placed on the soil 6 surrounding the plants 7 to be watered. The soil may be included in a flower pot, window box, or any other planter, and the watering device of the invention may also be placed directly on the ground. To facilitate the dripping action, the main body 1 of the watering device may be slightly elevated or suspended above the ground by legs 2 or by any other suitable supporting structures, preferably having the shape of appendages of a character so as not to detract from the appearance of the character.

Conveniently, the eye 3 of the illustrated character forms a handle which can easily be grasped by a user to permit the user to secure the externally threaded portion 4 in an corresponding internally threaded opening at the top of the main body 1 in order to form a filler cap and prevent loss of water through the internally threaded opening after the interior has been filled, and to enable the externally threaded portion to be removed from the corresponding internally threaded opening. The eye of the illustrated toad may of course be replaced by other protruding body parts, appendages, articles of clothing, or the like depending on the nature of the character represented by the shape of the main body, although it is preferred that the shape of the cap be consistent with the nature of the character, so as to contribute rather than detract from the appearance of the character.

In the variation of the preferred embodiment illustrated in FIG. 2, a flow control or adjustment device 7 is included to permit the drip rate to be adjusted for different types of house plants or different ambient environmental conditions. The adjustment device is not intended to provide dynamic feedback of the environmental conditions, or of such factors as soil moisture, but rather permits adjustment of the predetermined flow rate, for example by varying the size of the openings through which water passes from the interior to the exterior of the watering device. As illustrated, the adjustment device includes a handle 8 extending through a slot 9 in the main body 1, and optional scale or calibration markings 10 situated above the slot 9.

Any suitable flow control device be utilized, including the apertured plate arrangement 11 for adjusting the sizes of openings 12 as schematically illustrated in FIG. 3, as well as valves or other flow control devices (not shown), or even a zipper or other closure device (not shown) for opening or closing the slot in the main body of the receptacle.

Having thus described a preferred embodiment of the invention and variations of the preferred embodiment in sufficient detail to enable those skilled in the art to make and use the invention, it will nevertheless be appreciated that numerous further variations and modifications of the illustrated embodiment may be made without departing from the spirit of the invention, and it is intended that the invention not be limited by the above description or accompanying drawings, but that it be defined solely in accordance with the appended claims.

What is claimed is:

1. A watering device, comprising:
   a receptacle including a main body having a hollow interior arranged to hold water and to permit passage of water to an exterior of the main body at a rate sufficient to cause the water to form droplets on the exterior of the receptacle and to drip onto a surface on which the receptacle is placed, wherein said receptacle has a shape of a character and includes supporting appendages extending downwardly from the main body, said supporting appendages being arranged to contact said surface and elevate the main body of said receptacle above said surface to a position at which said water drips onto said surface, said supporting appendages having a shape consistent with appendages of said character so as to appear to be part of the character, and wherein said receptacle further includes an opening through which water may be introduced into the hollow interior, and a member arranged to close said opening, said member arranged to close said opening including a main portion that protrudes from the receptacle when said opening is closed, said main portion having a shape consistent with said character so as to also appear to be part of the character.

2. A watering device as claimed in claim 1, wherein said character is an animal, said supporting elements being arranged to form legs of said animal.

3. A watering device as claimed in claim 2, wherein said opening is an internally threaded opening, said member arranged to close said opening includes a threaded portion having external threads that complement the internal threads of the opening.

4. A watering device as claimed in claim 3, wherein said main portion has a shape of an eye of said character.

5. A watering device as claimed in claim 2, wherein said main portion has a shape of an eye of said character.

6. A watering device as claimed in claim 1, wherein said opening is an internally threaded opening, said member arranged to close said opening includes a threaded portion having external threads that complement the internal threads of the opening.

7. A watering device as claimed in claim 6, wherein said main portion has a shape of an eye of said character.

8. A watering device as claimed in claim 1, wherein said main portion has a shape of an eye of said character.

9. A watering device as claimed in claim 1, further comprising a flow control device arranged to permit user adjustment of a rate at which water passes from the interior to the exterior of the receptacle.

10. A watering device as claimed in claim 9, wherein said flow control device includes a handle extending through a slot in the receptacle so that the handle can be grasped and moved by the user.

* * * * *